US012459678B2

(12) United States Patent
Cui et al.

(10) Patent No.: US 12,459,678 B2
(45) Date of Patent: Nov. 4, 2025

(54) ANTICIPATORY SUPPLY CHAIN COORDINATION WITH CONNECTED VEHICLE FLEET AND UNMANNED AERIAL VEHICLE INTEGRATIONS

(71) Applicant: AT&T Intellectual Property I, L.P., Atlanta, GA (US)

(72) Inventors: Zhi Cui, Sugar Hill, GA (US); Roger D. Wickes, Gainesville, GA (US); Eric Zavesky, Austin, TX (US); James Pratt, Round Rock, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 258 days.

(21) Appl. No.: 17/896,135

(22) Filed: Aug. 26, 2022

(65) Prior Publication Data

US 2024/0070602 A1    Feb. 29, 2024

(51) Int. Cl.
| | | |
|---|---|---|
| *B64U 10/13* | (2023.01) | |
| *B60L 53/57* | (2019.01) | |
| *B60S 5/02* | (2006.01) | |
| *B64U 50/19* | (2023.01) | |
| *G05D 1/00* | (2024.01) | |
| *G06Q 10/0835* | (2023.01) | |
| *G06Q 10/087* | (2023.01) | |

(52) U.S. Cl.
CPC ....... *B64U 10/13* (2023.01); *G06Q 10/08355* (2013.01); *G06Q 10/087* (2013.01); *B60L 53/57* (2019.02); *B60S 5/02* (2013.01); *B64U 50/19* (2023.01); *B64U 2201/10* (2023.01); *B64U 2201/20* (2023.01); *G05D 1/101* (2013.01)

(58) Field of Classification Search
CPC ....... G06Q 10/083; G06Q 10/08; B60L 58/13
See application file for complete search history.

(56) References Cited

U.S. PATENT DOCUMENTS

| 9,305,280 | B1 * | 4/2016 | Berg | G06Q 30/0265 |
|---|---|---|---|---|
| 11,727,341 | B2 * | 8/2023 | Sweeney | G06Q 10/083 |
| | | | | 705/330 |
| 2013/0069803 | A1 * | 3/2013 | McCormick | G07C 5/008 |
| | | | | 340/989 |
| 2018/0016027 | A1 * | 1/2018 | Cheatham, III | B64U 10/25 |
| 2018/0137454 | A1 * | 5/2018 | Kulkarni | G05D 1/021 |

(Continued)

*Primary Examiner* — Florian M Zeender
*Assistant Examiner* — Vanessa Deligi
(74) *Attorney, Agent, or Firm* — Hartman & Citrin LLC

(57) ABSTRACT

Concepts and technologies disclosed herein are directed to anticipatory supply chain coordination with connected vehicle fleet and unmanned aerial vehicle ("UAV") integrations. According to one aspect disclosed herein, an energy provider system can obtain connected vehicle information from a connected vehicle. The connected vehicle information can include a vehicle identifier that uniquely identifies the connected vehicle, an energy capacity remaining for the connected vehicle, and a current location of the connected vehicle. The energy provider system can obtain order information from an inventory management system. The order information can include a destination location to which a physical order is to be delivered. The energy provider system can determine a route to the destination location based, at least in part, upon the energy capacity remaining and the current location. The energy provider system can then provide the route to the connected vehicle.

20 Claims, 7 Drawing Sheets

(56) References Cited

U.S. PATENT DOCUMENTS

| | | | |
|---|---|---|---|
| 2021/0046829 A1* | 2/2021 | Gaither | G01C 21/3438 |
| 2022/0299337 A1* | 9/2022 | Joao | H02J 7/00032 |
| 2024/0027199 A1* | 1/2024 | Kumar | G01C 21/3407 |

\* cited by examiner

ANTICIPATORY SUPPLY CHAIN COORDINATION WITH CONNECTED VEHICLE FLEET AND UNMANNED AERIAL VEHICLE INTEGRATIONS

BACKGROUND

Unmanned aerial vehicles ("UAVs"), commonly known as drones, include aircraft capable of flight without a human pilot onboard. Drones come in a variety of shapes and sizes and utilize different designs to achieve flight. Drones are becoming increasingly popular in government operations, civil operations, and even for recreational/hobbyist use.

Supply chains have grown in complexity and delivery logistics as consumers expect nearly instantaneous product delivery after their order is placed. While some advances in technology have enabled semi-automated fleets (e.g., hauling trucks or naval ships) and last-mile (e.g., UAV delivery to consumers) solutions, these solutions are siloed and lack efficient coordination.

SUMMARY

Concepts and technologies disclosed herein are directed to anticipatory supply chain coordination with connected vehicle fleet and unmanned aerial vehicle ("UAV") integrations. According to one aspect of the concepts and technologies disclosed herein, an energy provider system can obtain connected vehicle information from a connected vehicle. The connected vehicle information can include a vehicle identifier that uniquely identifies the connected vehicle, an energy capacity remaining for the connected vehicle, and a current location of the connected vehicle. The energy provider system can obtain order information from an inventory management system. The order information can include a destination location to which a physical order is to be delivered. The energy provider system determines a route to the destination location based, at least in part, upon the energy capacity remaining and the current location. The energy provider system can then send the route to the connected vehicle.

In some embodiments, the connected vehicle is part of a connected vehicle fleet that includes a plurality of connected vehicles. In some embodiments, the energy provider system can obtain additional connected vehicle information from the connected vehicle fleet. The additional connected vehicle information can include an additional vehicle identifier that uniquely identifies an additional connected vehicle of the plurality of connected vehicles in the connected vehicle fleet, an additional energy capacity remaining for the additional connected vehicle, and an additional current location of the additional connected vehicle.

In some embodiments, the energy provider system can determine an additional route to the destination location based, at least in part, upon the additional energy capacity remaining and the additional current location of the additional connected vehicle. The energy provider system can then provide the additional route to the additional connected vehicle.

In some embodiments, the energy provider system can obtain traffic information along the route. The energy provider system can modify the route based upon the traffic information and send the modified route to the connected vehicle.

In some embodiments, the energy provider system can obtain UAV management information associated with a UAV located in an airspace over the route. The energy provider system can then instruct the UAV to dock with the connected vehicle. In some embodiments, the energy provider system can instruct the UAV to replenish, at least in part, an energy capacity of the connected vehicle. In other embodiments, the energy provider system can instruct the UAV to provide to the connected vehicle at least a portion of the physical order. For example, the physical order can include a plurality of items, one or more of which can be provided to the connected vehicle by the UAV.

In some embodiments, the connected vehicle is an electric-powered vehicle. The energy capacity can include a battery capacity. The energy capacity remaining can include a battery capacity remaining of the electric-powered vehicle. In other embodiments, the connected vehicle is an internal combustion engine-powered vehicle. The energy capacity can include a fuel capacity. The energy capacity remaining can include a fuel capacity remaining of the internal combustion engine-powered vehicle. In still other embodiments, the connected vehicle is a hybrid electric and internal combustion engine-powered vehicle. The energy capacity can include a hybrid energy capacity. The energy capacity remaining can include a hybrid energy capacity remaining of the hybrid electric and internal combustion engine-powered vehicle.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
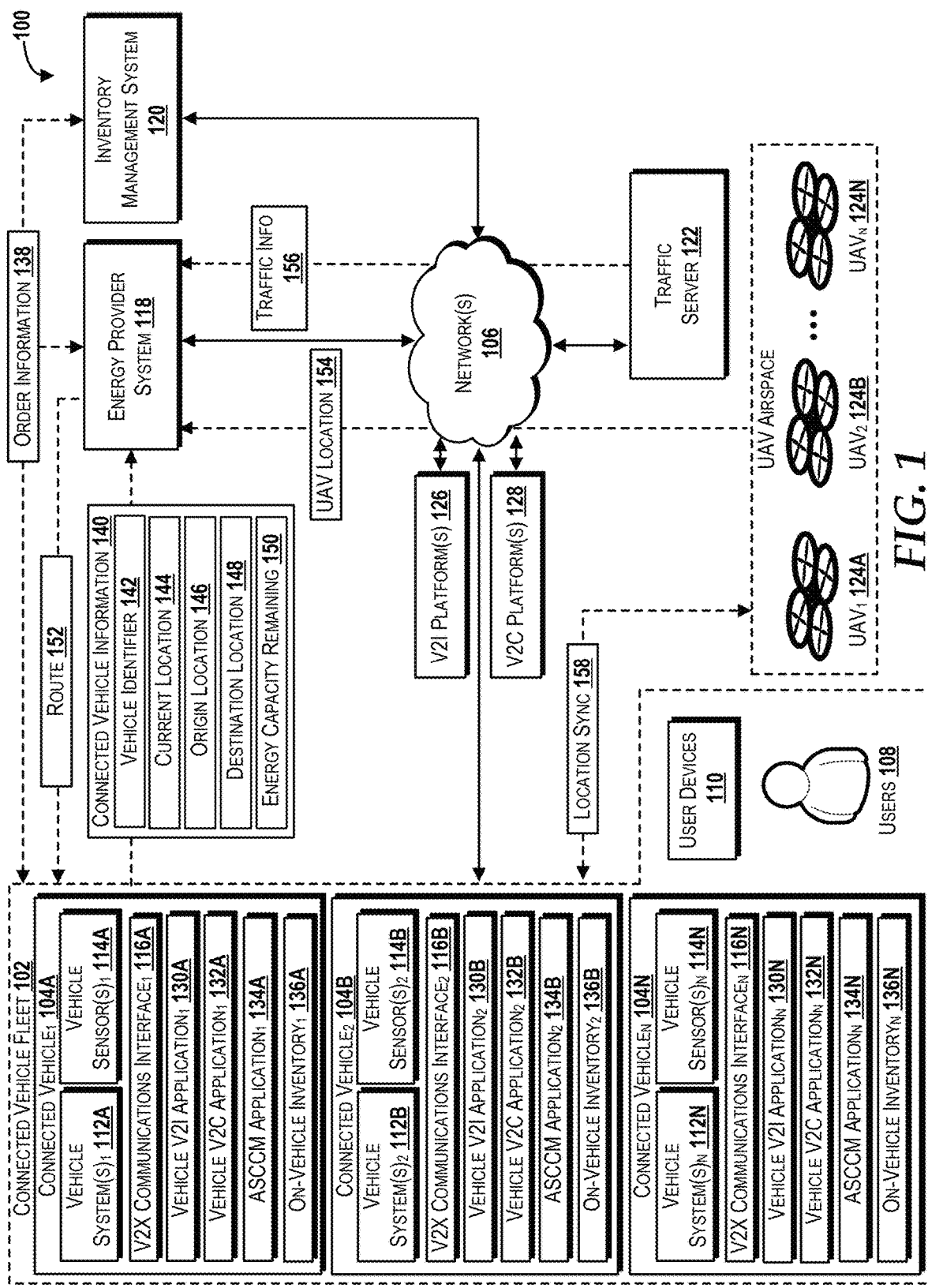
FIG. 1 is a block diagram illustrating aspects of an illustrative operating environment for various concepts disclosed herein.

Supply chains have grown in complexity and delivery logistics as consumers expect nearly instantaneous product delivery after their order is placed. While some advances in technology have enabled semi-automated fleets (e.g., hauling trucks or naval ships) and last-mile (e.g., UAV delivery to consumers) solutions, these solutions are siloed and lack efficient coordination. First, not only the large-cargo components of the supply chain must be tracked, but also the consumer-delivery endpoints. Instead of coordinating inventory via static, non-central hubs, a system should be able to accommodate moving components within a fleet such that fuel and wait utilization is minimized. Second, as all parts of the inventory supply chain are turning to electric vehicles or rechargeable platforms, the movement and coordination of these parts must similarly account for recharge times and options. Accommodating both static recharge points and portable, temporary solar-based options, a system should understand precisely when and for how long each of the individual entities must recharge. All of these accommodations can and should be made to operate a vehicle fleet at 24 hours per day if required. Finally, management of the inventory itself should not be a fixed point-to-point process. Instead, inventory, from its position in a fleet vehicle to its delivery to the consumer should remain fluid and be under constant optimization as the fleet itself experiences updates (e.g., traffic, recharge, weather events, etc.). The concepts and technologies disclosed herein address the aforementioned shortcomings.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, Drones, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of anticipatory supply chain coordination with connected vehicle fleet and unmanned aerial vehicle UAV integrations will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein. The operating environment 100 shown in FIG. 1 includes a connected vehicle fleet 102 that includes a plurality of connected vehicles 104A-104N (hereafter referred to individually as "connected vehicle 104" or collectively as "connected vehicles 104"). The connected vehicles 104 can connect to and operate in communication with one or more networks 106 to perform various functionality disclosed herein.

Each of the connected vehicles 104 can be a car, truck, van, motorcycle, moped, go-kart, golf cart, tank, ATV, or any other ground-based vehicle. It should be understood, however, that aspects of the concepts and technologies disclosed herein can extend to other vehicles that have amphibious and/or flight capabilities. The connected vehicles 104 can accommodate any number of vehicle occupants (shown as "users 108"), each of whom can be a driver or a passenger of one of the connected vehicles 104.

The connected vehicles 104 can be human-operated, autonomous, or partially autonomous. As an autonomous vehicle, the connected vehicle 104 can have multiple modes, including, for example, a driver-operated mode, a partially autonomous control mode, and a fully autonomous control mode. In some embodiments, the connected vehicles 104 can operate as Level 3 or Level 4 vehicles as defined by the National Highway Traffic Safety Administration ("NHTSA"). The NHTSA defines a Level 3 vehicle as a limited self-driving automation vehicle that enables a driver to cede full control of all safety-critical functions under certain traffic or environmental conditions and in those conditions to rely heavily on the connected vehicle 104 to monitor for changes in those conditions requiring transition back to driver control. The driver is expected to be available for occasional control, but with sufficiently comfortable transition time. The NHTSA defines a Level 4 vehicle as a full self-driving automation vehicle that is designed to perform all safety-critical driving functions and monitor roadway conditions for an entire trip to a destination. Such a design anticipates that the driver will provide destination or navigation input, but is not expected to be available for control at any time during the trip. It should be understood that the concepts and technologies disclosed herein are applicable to existing autonomous vehicle technologies and are readily adaptable to future autonomous vehicle technologies.

The manufacturer, vehicle type (e.g., car, truck, van, etc.), and/or vehicle specification, including, but not limited to, occupant capacity, gross vehicle weight, towing capacity, engine type (e.g., internal combustion, electric, or hybrid), energy type (e.g., fuel, battery, or hybrid), motor/engine size, drive type (e.g., front wheel drive, rear wheel drive, all-wheel drive, or four wheel drive), and transmission type (e.g., manual, automatic, dual clutch, continuously variable, etc.) of the connected vehicles 104 should not be limited in any way. The concepts and technologies disclosed herein are applicable to all connected vehicles 104 that have, at a minimum, a ground-based operational mode. Moreover, human-powered vehicles such as bicycles, scooters, and the like are also contemplated, although those skilled in the art will appreciate that some aspects of the concepts and technologies disclosed herein may not be applicable to these vehicle types.

In some embodiments, the connected vehicle fleet 102 is used to deliver goods to one or more destination locations. As such, the connected vehicle fleet 102 may be associated with a shipping company, a retailer, an e-tailer, or other entity that is at least partially responsible for delivery of goods to one or more destination locations. For purposes of explanation and not limitation, the connected vehicle fleet 102 will be described as delivering goods ordered online, such as a from an e-tailer's website or associated device application. Those skilled in the art will appreciate, however, that the concepts and technologies disclosed herein may find applicability in other implementations. Accordingly, the exemplary implementation of delivering goods should not be construed as being limiting in any way.

Each of the users 108 can be associated with one or more user devices 110. According to various embodiments, the functionality of the user devices 110 may be provided, at least in part, by one or more mobile telephones, smartphones, tablet computers, slate computers, smart watches, fitness devices, smart glasses, other wearable devices, mobile media playback devices, set top devices, navigation devices, laptop computers, notebook computers, ultrabook computers, netbook computers, server computers, computers of other form factors, computing devices of other form factors, other computing systems, other computing devices, Internet of Things ("IoT") devices, other unmanaged devices, other managed devices, and/or the like. It should be understood that the functionality of the user devices 110 can be provided by a single device, by two or more similar devices, and/or by two or more dissimilar devices.

The user devices 110 can be configured to communicate with one or more of the connected vehicles 104 via a wired connection, a wireless connection, or both. In some embodiments, the user devices 110 can communicate with the connected vehicles 104 via a short-range communication technology such as BLUETOOTH. Other wireless technologies such as Wi-Fi are also contemplated. Wired connections may be facilitated by a universal serial bus ("USB")-based connection, although other wired connection types, including proprietary connection types are also contemplated. Moreover, the user devices 110 may communicate directly or via some other interface with the connected vehicles 104 through one or more vehicle systems 112.

The illustrated connected vehicle$_1$ 104A is associated with the vehicle system(s)$_1$ 112A. The illustrated connected vehicle$_2$ 104B is associated with the vehicle system(s)$_2$ 112B. The illustrated connected vehicle$_N$ 104N is associated with the vehicle system(s)$_N$ 112N. The vehicle system(s) 112 can include one or more systems associated with any aspect of the connected vehicle 104. For example, the vehicle systems 112 can include the engine/motor, fuel system, ignition system, electrical system, charging system, battery system, exhaust system, drivetrain system, suspension system, steering system, braking system, parking assistance system (e.g., parking sensors), navigation system, radio system, infotainment system, communication system (e.g., in-car WI-FI and/or cellular connectivity), BLUETOOTH and/or other connectivity systems that allow connectivity with other systems, devices, and/or networks disclosed herein, driver assistance system (e.g., lane departure warning, lane keep assist, blind spot monitoring, parking assist, cruise control, automated cruise control, autonomous mode, semi-autonomous mode, and the like), tire pressure monitoring systems, combinations thereof, and the like. In some embodiments, the user devices 110 can be integrated (permanently or temporarily) with the connected vehicles 104 such as part of the vehicle system(s) 112. The user devices 110 may be retrofitted into the connected vehicles 104 as aftermarket equipment or may be made available as standard or optional original equipment manufacturer ("OEM") equipment of the connected vehicle 104. The vehicle system(s) 112 can utilize output from one or more vehicle sensors 114 to perform various operations, including self-driving operations, UAV docking operations, and other operations disclosed herein, for example.

The illustrated connected vehicle$_1$ 104A is associated with the vehicle sensor(s)$_1$ 114A. The illustrated connected vehicle$_2$ 104B is associated with the vehicle sensor(s)$_2$ 114B. The connected vehicle$_N$ 104N can be associated with the vehicle sensors(s)$_N$ 114N. The vehicle sensors 114 can provide output to one or more sensor controllers (e.g., operating as part of the vehicle system(s) 112) that can utilize the output to perform various vehicle operations. Modern vehicles have numerous systems that are controlled, at least in part, based upon the output of multiple sensors, including, for example, sensors associated with the operation of various vehicle components such as the drivetrain (e.g., engine, transmission, and differential), brakes, suspension, steering, and safety components. The concepts and technologies disclosed herein can utilize any of the vehicle sensors 114. It should be understood, however, that aspects of the concepts and technologies disclosed herein may rely on the output from sensors such as cameras, proximity sensors, radar sensors, and light detection and ranging ("LiDAR") sensors that aid in providing the connected vehicle 104 with information about the environment surrounding the connected vehicle 104, other vehicles (not shown), and pedestrians (also not shown). Those skilled in the art will appreciate the use of these and/or other similar sensors to enable the connected vehicles 104 to detect and classify objects in the environment (e.g., distinguish between roadside objects, other vehicles, and pedestrians), to perform self-driving operations (e.g., accelerate, decelerate, brake, change lanes, obey traffic signs and signals, and avoid collisions and accidents), and to perform specific operations disclosed herein such as UAV docking, among other operations.

In the illustrated example, the connected vehicles 104A can include a V2X communications interface$_1$ 116A that enables the connected vehicle$_1$ 104A to communicate with one or more other entities, such as the connected vehicles$_{2-N}$ 104B-104N, other vehicles (not shown), a V2C platform (not shown), a V2I platform (not shown), and other systems disclosed herein as will be described in greater detail below. The connected vehicles 104B-104N can include V2X communications interfaces 116B-116N as shown in the illustrated example. The V2X communications interfaces 116 can be or can include a cellular interface, a WLAN interface, a short-range communications interface, or a combination thereof. In some embodiments, the V2X communications interfaces 116 are based upon a standard specification such as IEEE 802.11p (i.e., for WLAN-based V2X technology) or 3GPP C-V2X (i.e., for cellular-based V2X technology). It should be understood that as of the filing date of this patent application, V2X technology is in its infancy and the technology has not yet been widely adopted. Organizations, such as the 5G Automotive Association ("5GAA"), exist to promote the use of V2X technology. Accordingly, those skilled in the art will appreciate that the V2X communications interfaces 116 can be embodied in accordance with existing standards, but will likely change over time as V2X technology matures. The V2X communications interface 116 should be construed as being compatible with both current and future V2X standards. Moreover, proprietary technologies that enable V2X-type communication are also contemplated.

The V2X communications interfaces 116 of the connected vehicles 104A-104N can communicate with each other, an energy provider system 118, an inventory management system 120, a traffic server 122, one or more of a plurality of UAVs 124A-124N, one or more V2I platforms 126, and one or more V2C platforms 128 via the network(s) 106. The network(s) 106 can be or can include one or more mobile telecommunications networks (e.g., wireless wide area network(s) "WWANs") operated by one or more mobile network operators. The WWANs may, in turn, include one or more core networks such as a circuit-switched core network ("CS CN"), a packet-switched core network ("PS CN"), an IP multimedia subsystem ("IMS") core network, multiples thereof, and/or combinations thereof. The WWAN can utilize one or more mobile telecommunications technologies, such as, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies (e.g., 802.11 WI-FI), and the like. The networks 106 can include one or more radio access networks ("RANs"). A RAN can utilize various channel access methods (which might or might not be used by the aforementioned standards) including, but not limited to, Time Division Multiple Access ("TDMA"), Frequency Division Multiple Access ("FDMA"), Single Carrier FDMA ("SC-FDMA"), CDMA, wideband CDMA ("W-CDMA"), Orthogonal Frequency Division Multiplexing ("OFDM"), Space Division Multiple Access ("SDMA"), and/or the like to provide a radio/air interface to the V2X communications interfaces 116. Data communications can be provided in part by a RAN using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like. Those skilled in the art will appreciate the use of colloquial terms such as 1G, 2G, 3G, 4G, and 5G to describe different generations of the aforementioned technologies. An example configuration of the network 106 is illustrated and described herein with reference to FIG. 5.

The connected vehicle$_1$ 104A can utilize a vehicle V2I application$_1$ 130A and a V2C application$_1$ 132A to communicate with one or more V2C platforms and one or more V2I platforms (both not shown), respectively. Similarly, the autonomous vehicles$_{2-N}$ 104B-104N can utilize vehicle V2I applications$_{2-N}$ 130A-130N (hereafter referred to individually as "vehicle V2I application 130" or collectively as "vehicle V2I applications 130") and V2C applications$_{2-N}$ 132B-132N (hereafter referred to individually as "vehicle V2C application 132" or collectively as "vehicle V2C applications 132") to communicate with one or more V2C platforms and one or more V2I platforms (both not shown), respectively. Although separate V2I and V2C applications 130, 132 are shown, the functionality of these applications may be combined in a single V2X application (not shown).

The V2I platform(s) 126 can provide one or more V2I services that utilize one or more V2I devices, such as lane marking devices and roadside devices (e.g., signs and traffic lights), to communicate with the connected vehicles 104. For example, the V2I services can capture, from the connected vehicles 104, data such as the speed and other metrics. These metrics can be used as part of traffic data collection. The V2I services also can provide data to the connected vehicles 104 to inform the vehicle occupant(s) (e.g., the user(s) 108) of safety information, accident information, mobility information, weather information, other environment-related condition information, and/or other information. In some embodiments, at least part of the V2I platform 126 can be hosted on a cloud computing platform (best shown in FIG. 7) including cloud resources such as compute, memory/storage, and other resources.

The V2C platform(s) 128 can provide, to the connected vehicles 104, one or more V2C services via one or more V2C cloud networks (both not shown). Although the V2C platform 128 is described specifically as "vehicle-to-cloud," the V2C platform 128 may alternatively be referred to as a "vehicle-to-network" platform to embody connectivity between the connected vehicles 104 and other non-cloud network types. The V2C services can be or can include services, such as, but not limited to, navigation services, emergency services, energy services (e.g., refueling and/or charging), logistics services, delivery services, concierge services, information services, entertainment services, or any combination thereof served via the V2C cloud network (s). Other connected car services are contemplated as the breadth of connected car capabilities are expected to mature in the future. In some embodiments, at least part of the V2C platform 128 can be hosted on a cloud computing platform (best shown in FIG. 7) including cloud resources such as compute, memory/storage, and other resources.

The connected vehicles 104A-104N can execute, via one or more processors (best shown in FIGS. 3 and 4), anticipatory supply chain coordination management ("ASCCM") applications 134A-134N, respectively (hereafter referred to individually as "ASCCM application 134" or collectively as "ASCCM applications 134") to perform various operations. The ASCCM applications 134 can maintain on-vehicle inventories 136A-136N (hereafter referred to individually as "on-vehicle inventory 136" or collectively as "on-vehicle inventories 136"). The on-vehicle inventories 136 can include one or more products, each of which can include a stock keeping unit ("SKU"), a barcode, a tracking number, an RFID tag, an NFC tag, another identifier, or some combination thereof that uniquely identifies the products and enables the ASCCM applications 134 to track the on-vehicle inventories 136. In some embodiments, the connected vehicles 104 can replenish the on-vehicle inventories 136 based upon order information 138 received from the inventory management system 120. The inventory management system 120 can manage product inventory that is stored in one or more warehouses and used for order fulfillment. The inventory management system 120 can manage inventory for a single seller or multiple sellers. The inventory management system 120 can handle direct customer orders or drop-ship orders submitted by a third party. In some embodiments, the connected vehicles 104 can maintain stock of certain products that are popular based upon historical sales numbers, seasonal items (e.g., back-to-school items), other metrics, and/or the like. In this manner, the connected vehicles 104 can shorten delivery times. In some embodiments, the connected vehicles 104 can be resupplied via the UAVs 124, including while the connected vehicles 104 are stopped or enroute.

The ASCCM applications 134 can provide connected vehicle information 140 to the energy provider system 118. The illustrated connected vehicle information 140 includes a vehicle identifier 142, a current location 144, an origin location 146, a destination location 148, and an energy capacity remaining 150. The vehicle identifier 142 can uniquely identify the connected vehicle 104 among the connected vehicles 104 in the connected vehicle fleet 102. For example, the vehicle identifier 142 can be a vehicle identification number ("VIN"), a registration identifier (e.g., a numeric or alphanumeric license plate identifier), or a proprietary identifier (e.g., provided by the energy provider associated with the energy provider system 118). The current location 144 can be a physical address, latitude/longitude coordinates, a landmark, or the like. In some embodiments, the current location 144 can be determined by one or more of the vehicle systems 112 (e.g., GPS) and/or one or more of the vehicle sensor(s) 114. In some embodiments, the current location 144 can be determined based upon location information received from the network(s) 106 (e.g., A-GPS). The origin location 146 is a starting location of the connected vehicle 104. The origin location 146 may be a home or place of business of one or more of the users 108. The origin location 146 may be the same as the current location 144, such as when a new route 152 is calculated from the current location 144 to the destination location 148. The destination location 148 is an ending location of the connected vehicle 104. The destination location 148 may be a home or place of business of one or more customers to which a physical order (e.g., identified by the order information 138) is to be delivered. The energy capacity remaining 150 can be a battery capacity, a fuel capacity, or a hybrid energy capacity depending upon how the connected vehicle 104 is powered. The energy capacity remaining 150 of an electric-powered vehicle can be represented as a percentage charge remaining in the battery of the electric-powered vehicle, the kilowatt-hour(s) remaining, or the distance (e.g., in miles or kilometers) remaining. The energy capacity remaining 150 of an internal combustion engine-powered vehicle can be represented as a percentage of fuel remaining (e.g., gasoline or diesel) or a distance (e.g., in miles or kilometers) remaining. The energy capacity remaining 150 of a hybrid electric and internal combustion engine-powered vehicle can be represented as a percentage charge and a percentage of fuel remaining or a combined percentage of charge and fuel remaining or a distance remaining. The connected vehicles 104 may utilize alternative energy sources such as hydrogen fuel cell. As such, the energy capacity remaining 150 can be represented in other ways not explicitly described herein.

The ASCCM application 134 can receive the route 152 from the energy provider system 118. The route 152 can update the origin location 146 and the destination location 148 in consideration of the order information 138 received from the inventory management system 120, UAV location information 154 received from one or more of the plurality of UAVs 124, traffic information 156 received from the traffic server 122, and/or based upon other information obtained by the energy provider system 118. The ASCCM application 134 can receive and process the order information 138 and corresponding routes 152 as first-in-first-out. Alternatively, the ASCCM application 134 can override the order in which the order information 138 and corresponding routes 152 are processed, such as to accommodate conditions known to the connected vehicle 104 based upon output of the vehicle system(s) 112 and/or the vehicle sensor(s) 114. In some embodiments, the route 152 can include docking with one or more of the plurality of UAVs 124. In these embodiments, the connected vehicle 104 can communicate with the UAV(s) 124 to perform a location sync 158 to ensure the docking operation can be performed with the required accuracy.

The energy provider system 118 can be a vehicle manufacturer. The energy provider system 118 can be a charging network provider. The energy provider system 118 can be an electric company or electric co-op. The energy provider system 118 can be a petroleum company, a subsidiary thereof, a franchise thereof, or an independent operator thereof. The energy provider system 118 can obtain the connected vehicle information from the connected vehicles 104 in the connected vehicle fleet 102. The energy provider system 118 can obtain the order information 138 from the inventory management system 120. The energy provider system 118 can obtain other information such as the UAV location(s) 154 and the traffic information 156 from the UAV(s) 124 and the traffic server 122, respectively. The energy provider system 118 can determine the route to the destination location 148 based upon the connected vehicle information 140, the order information 138, the UAV location(s) 154, and the traffic information 156. The energy provider system 118 can modify the route 152 based upon updated connected vehicle information 140, updated order information 138, updated UAV location(s) 154, updated traffic information 156, other information, a combination thereof, and/or the like.

The energy provider system 118 can instruct the UAV 124 to dock with the connected vehicle 104. In some embodiments, the energy provider system 118 can dock the UAV 124 with the connected vehicle 104 to deliver one or more products to the connected vehicle 104 based upon the order information 138. In some embodiments, the energy provider system 118 can dock the UAV 124 with the connected vehicle 104 to charge the connected vehicle 104 and/or refuel the connected vehicle 104.

The UAVs 124 can navigate autonomously during flight. Autonomous flight is used herein to refer to flight without human control. In some embodiments, the UAV 124 can be remotely controlled by a human user for flight testing, maintenance, emergency landings, or for other reasons. For example, the UAVs 124 may include an operational setting that allows control to be handed over to a human, such as one or more of the users 108. This control can be via line of sight or beyond line of sight utilizing one or more cameras installed on the UAVs 124 for sight. Those skilled in the art will appreciate the wide range of control options suitable for controlling the UAVs 124 during the aforementioned use cases and others.

The UAVs 124 can be any shape and size, and can utilize any design to achieve flight. In some embodiments, the UAVs 124 are fixed-wing aircraft. In some other embodiments, the UAVs 124 are rotary-wing aircraft. In some other embodiments, the UAVs 124 are ornithopter. Those skilled in the art will appreciate the wide range of propulsion systems that can be utilized by the UAVs 124.

Figure 2:
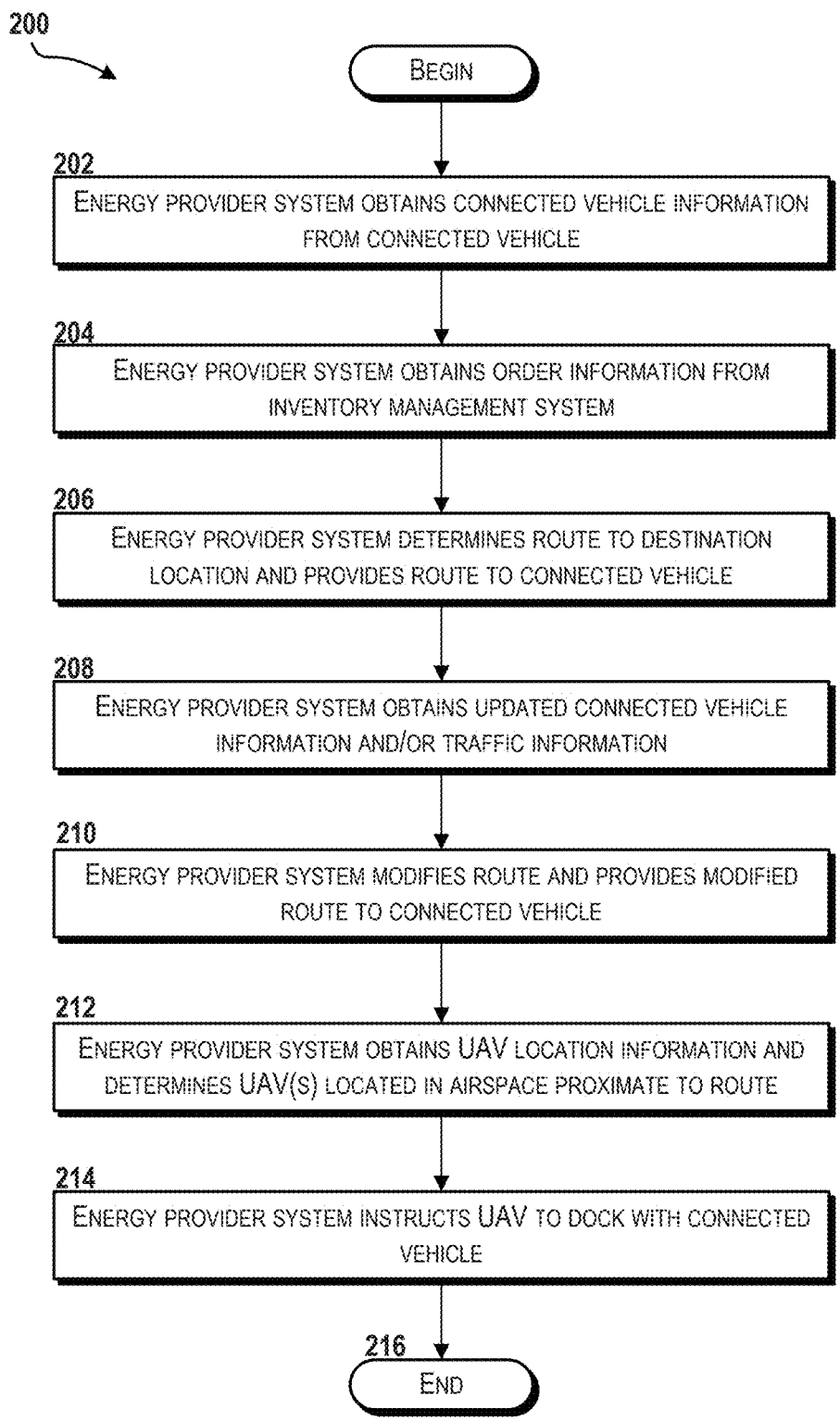
FIG. 2 is a flow diagram illustrating aspects of a method for coordinating supply chain with a connected vehicle fleet and a UAV, according to an illustrative embodiment of the concepts and technologies disclosed herein.

Turning now to FIG. 2, a method 200 for coordinating supply chain with a connected vehicle fleet 102 and a UAV 124 will be described, according to an illustrative embodiment of the concepts and technologies disclosed herein. It should be understood that the operations of the method disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the method disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the energy provider system 118 obtains the connected vehicle information 140 from the connected vehicle 104. Although the method 200 is described as being directed to a single connected vehicle 104, the method 200 can be performed simultaneously or sequentially for multiple connected vehicles 104 up to and including all of the connected vehicles 104 in the connected vehicle fleet 102. In some embodiments, the energy provider system 118 can obtain the connected vehicle information 140 periodically from the connected vehicle 104. The period can be determined by the energy provider system 118. In some embodiments, the energy provider system 118 can request on-demand the connected vehicle information 140 from the connected vehicle 104. In some embodiments, the connected vehicle 104 can provide the connected vehicle information 140 to the energy provider system 118 when there is a change to at least part of the connected vehicle information 140.

From operation 202, the method 200 proceeds to operation 204. At operation 204, the energy provider system 118 obtains the order information 138 from the inventory management system 120. In some embodiments, the inventory management system 120 can send the order information 138 to the energy provider system 118 individually for each order received or in a batch of multiple orders. The energy provider system 118 alternatively may request the order information 138 from the inventory management system 120.

From operation 204, the method 200 proceeds to operation 206. At operation 206, the energy provider system 118 determines the route 152 to the destination location 148 identified in the order information 138. The route 152 can be determined based upon the connected vehicle information 140 and the order information 138 obtained at operations 202, 204, respectively. Also at operation 206, the energy provider system 118 can provide the route 152 to the connected vehicle 104. From operation 206, the method 200 proceeds to operation 208. At operation 208, the energy provider system 118 can obtain updated connected vehicle information 140 (e.g., updated current location 144 and/or updated energy capacity remaining 150) and/or the traffic information 156. From operation 208, the method 200 proceeds to operation 210. At operation 210, the energy provider system 118 modifies the route 152 and provides the modified route 152 to the connected vehicle 104. The operations 208, 210 may be performed as needed (i.e., when updated information is available).

From operation 210, the method 200 proceeds to operation 212. At operation 212, the energy provider system 118 obtains the UAV location information 154 from one or more of the UAVs 124 and determines the UAV(s) 124 located in an airspace proximate to the route 152. What is proximate to the route 152 can be defined by the energy provider system 118. For example, any UAV 124 within one mile of the connected vehicle 104 may be considered proximate.

From operation 212, the method 200 proceeds to operation 214. At operation 214, the energy provider system 118 instructs a UAV 124 that is located in the airspace proximate to the route 152 to dock with the connected vehicle 104. In some embodiments, the energy provider system 118 can instruct the UAV 124 to provide the connected vehicle 104 with at least a portion of the physical order associated with the order information 138. In some embodiments, the energy provider system 118 additionally or alternatively can replenish at least a portion of the energy capacity (e.g., charge the battery and/or refuel) of the connected vehicle 104. In other embodiments, the energy provider system 118 can replenish a portion of the emergency capacity of the UAV 124 from the connected vehicle 104. Uniquely, in these embodiments, the UAV(s) 124 can act as an energy distribution component for the connected vehicle(s) 104 while those vehicles are in full operation.

From operation 214, the method 200 proceeds to operation 216. The method 200 can end at operation 216.

Figure 3:
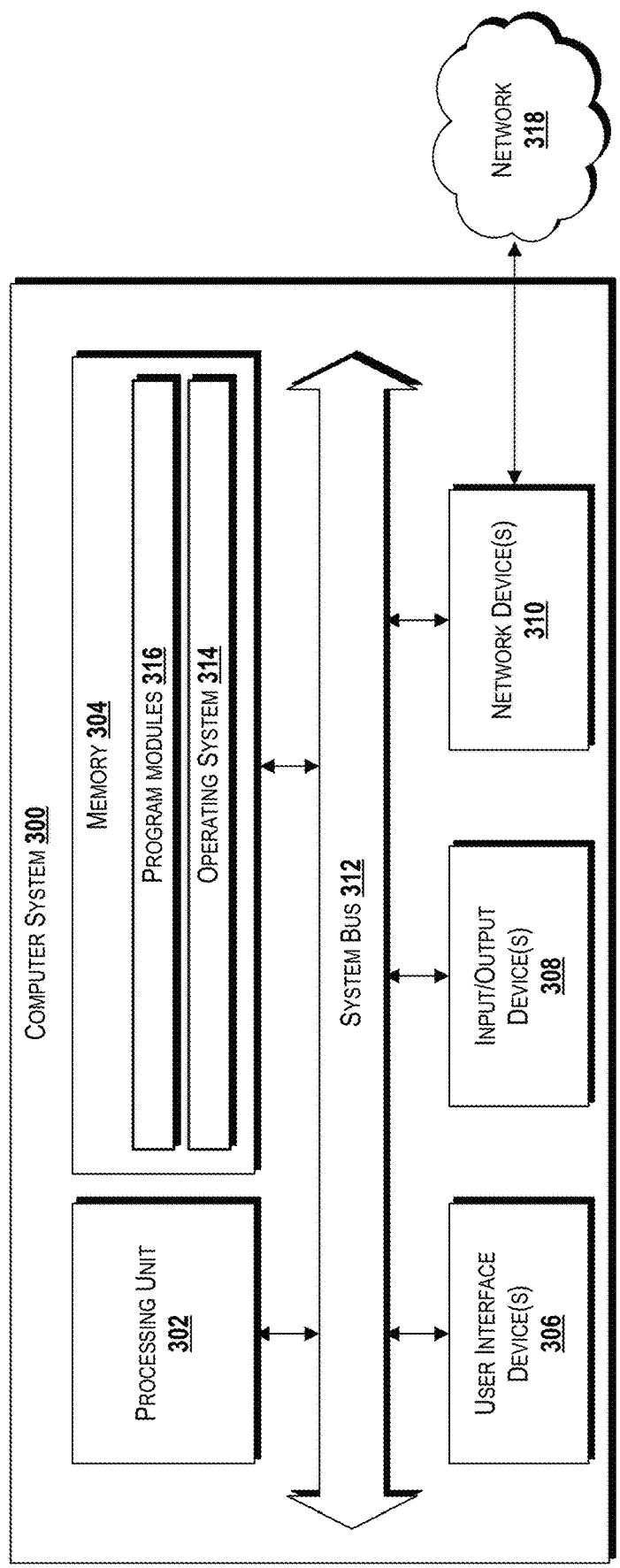
FIG. 3 is a block diagram illustrating an example computer system capable of implementing aspects of the concepts and technologies disclosed herein.

Turning now to FIG. 3, a block diagram illustrating a computer system 300 configured to provide the functionality described herein in accordance with various embodiments. In some embodiments, the user device(s) 110, the vehicle system(s) 112, the energy provider system 118, the inventory management system 120, the traffic server 122, the V2I platform(s) 126, the V2C platform(s) 128, or some combination thereof can be configured the same as or similar to the computer system 300.

The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 302 can be a single processing unit or a multiple processing unit that includes more than one processing component. Processing units are generally known, and therefore are not described in further detail herein.

The memory 304 communicates with the processing unit 302 via the system bus 312. The memory 304 can include a single memory component or multiple memory components. In some embodiments, the memory 304 is operatively connected to a memory controller (not shown) that enables communication with the processing unit 302 via the system bus 312. The memory 304 includes an operating system 314 and one or more program modules 316. The operating system 314 can include, but is not limited to, members of the WINDOWS family of operating systems from MICROSOFT CORPORATION, the LINUX family of operating systems, families of operating systems from APPLE CORPORATION, other operating systems, and/or the like.

The program modules 316 may include various software and/or program modules described herein. The program modules 316 can include the vehicle V2I application 130, the vehicle V2C application 132, and the ASCCM application 134 in an embodiment of the connected vehicle 104 and/or one or more of the vehicle system(s) 112 configured the same as or similar to the computer system 300. In some embodiments, multiple implementations of the computer system 300 can be used, wherein each implementation is configured to execute one or more of the program modules 316. The program modules 316 and/or other programs can be embodied in computer-readable media containing instructions that, when executed by the processing unit 302, perform the method 200 described herein. According to embodiments, the program modules 316 may be embodied in hardware, software, firmware, or any combination thereof. The memory 304 also can be configured to store the connected vehicle information 140, the order information 138, the route(s) 152, the UAV location(s) 154, the traffic information 156, other data disclosed herein, or a combination thereof.

By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium," "computer-readable storage medium," and variations thereof does not include waves or signals per se and/or communication media, and therefore should be construed as being directed to "non-transitory" media only.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display or printer.

The network devices 310 enable the computer system 300 to communicate with other networks or remote systems via the network(s) 318, such as the network(s) 106. Examples of the network devices 310 include, but are not limited to, a modem, a radio frequency ("RF") or infrared ("IR") transceiver, a telephonic interface, a bridge, a router, or a network card. The network 318 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 106 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 4:
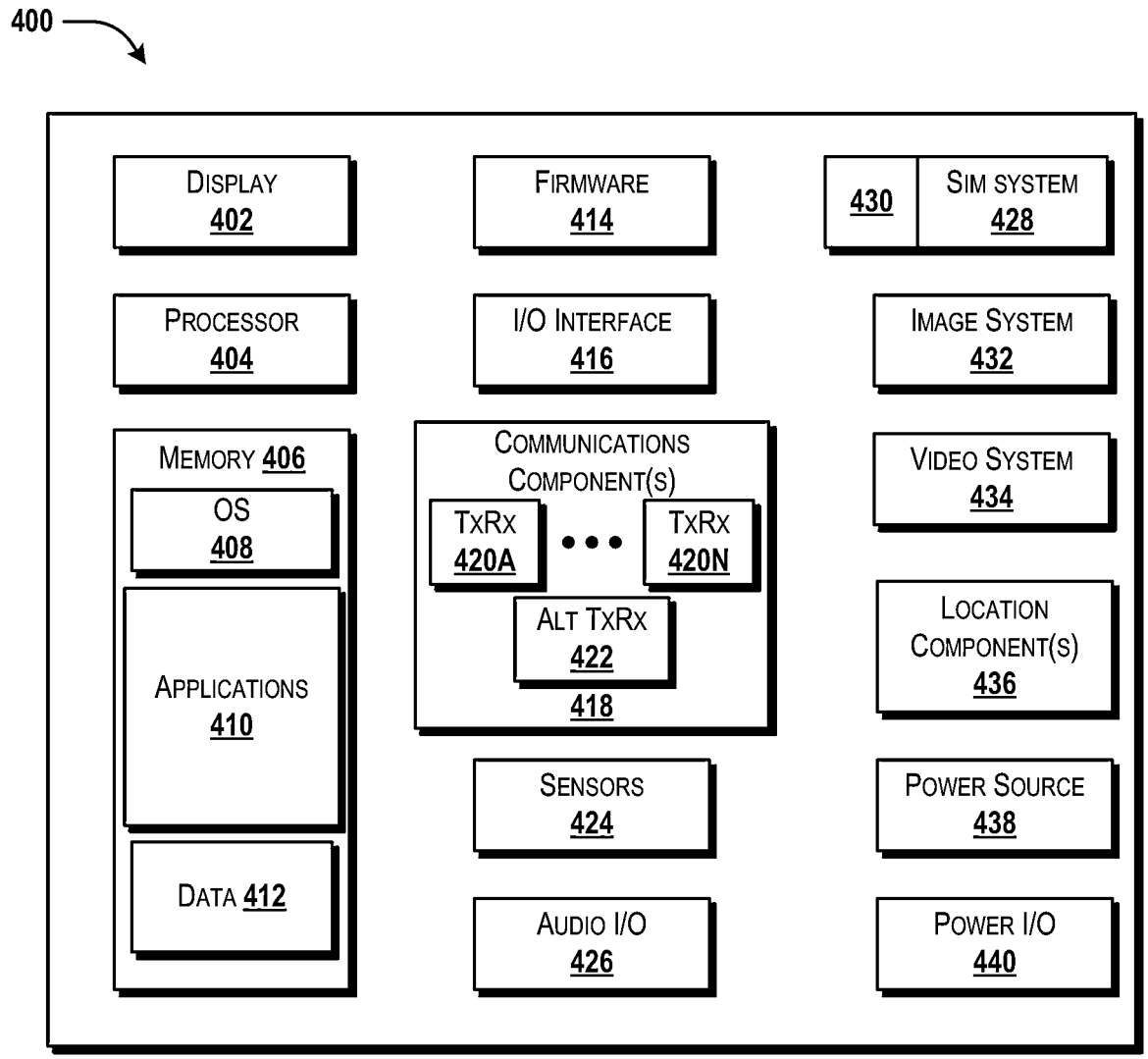
FIG. 4 is a block diagram illustrating an example mobile device capable of implementing aspects of the concepts and technologies disclosed herein.

Turning now to FIG. 4, an illustrative mobile device 400 and components thereof will be described. In some embodiments, the user devices 110 can be configured the same as or similar to the mobile device 400. In some embodiments, the vehicle system(s) 112 can be configured the same as or similar to the mobile device 400. While connections are not shown between the various components illustrated in FIG. 4, it should be understood that some, none, or all of the components illustrated in FIG. 4 can be configured to interact with one another to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 400 can also include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions stored in the memory 406, or the like. The application(s) 410 can include the vehicle V2I application 130, the vehicle V2C application 132, the ASCCM application 134, or some combination thereof.

The UI application can interface with the operating system 408 to facilitate user interaction with functionality and/or data stored at the mobile device 400 and/or stored elsewhere. In some embodiments, the operating system 408 can include a member of the IOS family of operating systems from APPLE INC., a member of the ANDROID OS family of operating systems from GOOGLE LLC, and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in entering/deleting data, entering and setting user IDs and passwords for device access, configuring settings, manipulating content and/or settings, multimode interaction, interacting with other applications 410, and otherwise facilitating user interaction with the operating system 408, the applications 410, and/or other types or instances of data 412 that can be stored at the mobile device 400. The data 412 can include the connected vehicle information 140, the order information 138, the route(s) 152, the UAV location(s) 154, the traffic information 156, or some combination thereof.

The applications 410, the data 412, and/or portions thereof can be stored in the memory 406 and/or in a firmware 414, and can be executed by the processor 404. The firmware 414 can also store code for execution during device power up and power down operations. It can be appreciated that the firmware 414 can be stored in a volatile or non-volatile data storage device including, but not limited to, the memory 406 and/or a portion thereof.

The mobile device 400 can also include an input/output ("I/O") interface 416. The I/O interface 416 can be configured to support the input/output of data such as location information, presence status information, user IDs, passwords, and application initiation (start-up) requests. In some embodiments, the I/O interface 416 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 can also include a communications component 418. The communications component 418 can be configured to interface with the processor 404 to facilitate wired and/or wireless communications with one or more networks, such as the network 106, the Internet, or some combination thereof. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments, one or more of the transceivers of the communications component 418 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 418 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 418 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 418 can include a first transceiver ("TxRx") 420A that can operate in a first communications mode (e.g., GSM). The communications component 418 can also include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 can also include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 418 can also facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 can also include one or more sensors 424. The sensors 424 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 can also include a subscriber identity module ("SIM") system 428. The SIM system 428 can include a universal SIM ("USIM"), a universal integrated circuit card ("UICC"), eSIM, and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 can also include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another device. The video and/or photo content can also be shared with other devices via various types of data transfers via wired and/or wireless communication devices as described herein.

The mobile device 400 can also include one or more location components 436. The location components 436 can be configured to send and/or receive signals to determine a geographic location of the mobile device 400. According to various embodiments, the location components 436 can send and/or receive signals from global positioning system ("GPS") devices, assisted-GPS ("A-GPS") devices, WI-FI/WIMAX and/or cellular network triangulation data, combinations thereof, and the like. The location component 436 can also be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 can also include a power source 438. The power source 438 can include one or more batteries, power supplies, power cells, and/or other power subsystems including alternating current ("AC") and/or direct current ("DC") power devices. The power source 438 can also interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 400 or other devices or computers described herein, such as the computer system 300 described above with reference to FIG. 3. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 400 in order to store and execute the software components presented herein. It is also contemplated that the mobile device 400 may not include all of the components shown in FIG. 4, may include other components that are not explicitly shown in FIG. 4, or may utilize an architecture completely different than that shown in FIG. 4.

Figure 5:
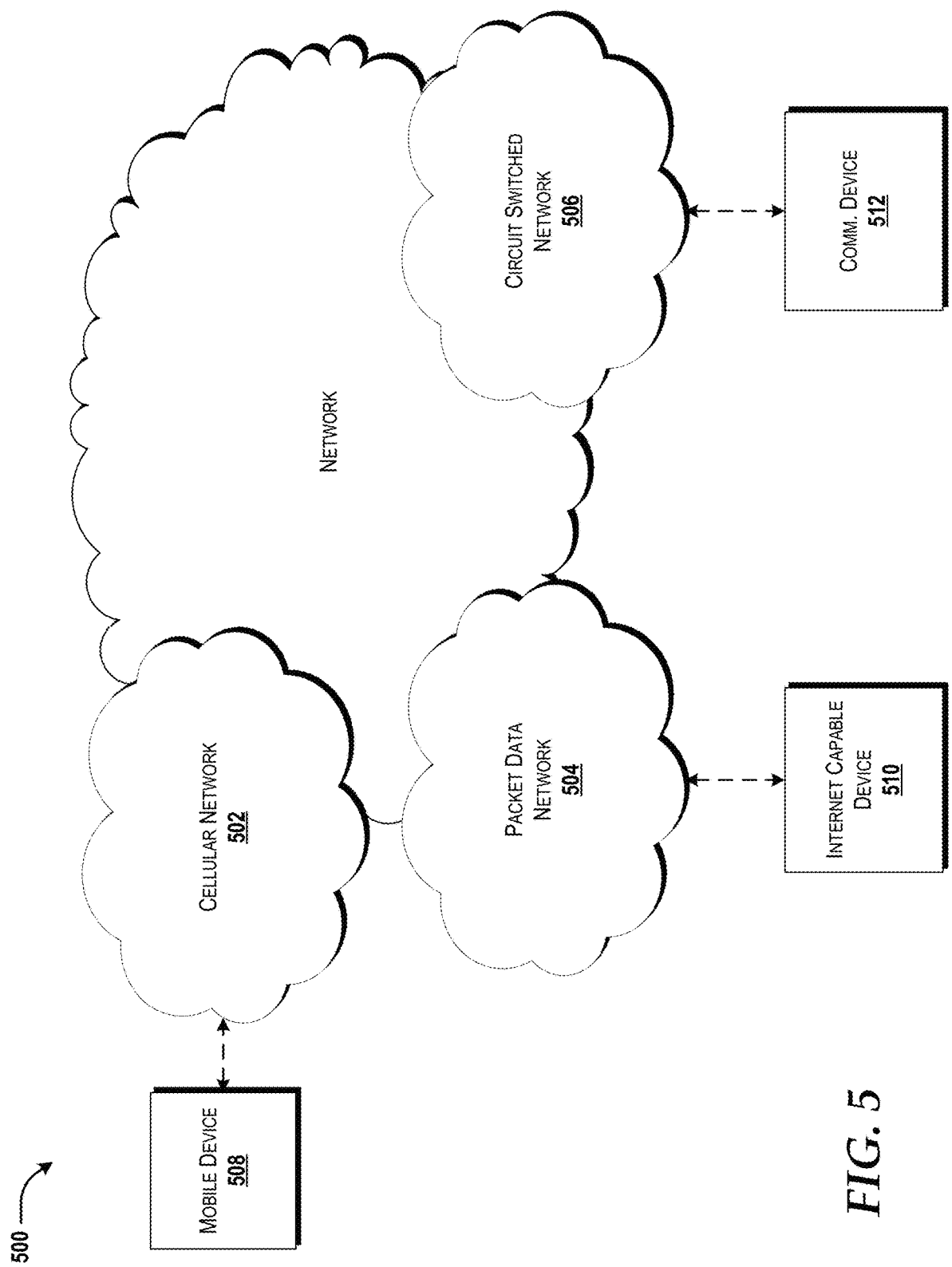
FIG. 5 is a block diagram illustrating an example network capable of implementing aspects of the concepts and technologies disclosed herein.

Turning now to FIG. 5, details of a network 500 are illustrated, according to an illustrative embodiment. In some embodiments, the network(s) 106 shown in FIG. 1 can be configured the same as or similar to the network 500. The network 500 includes a cellular network 502, a packet data network 504, and a circuit switched network 506 (e.g., a public switched telephone network). The cellular network 502 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, the user device 110, the mobile device 400, a cellular telephone, a user equipment, a mobile terminal, a PDA, a laptop computer, a handheld computer, and combinations thereof, can be operatively connected to the cellular network 502. The mobile communications device 508 can be configured similar to or the same as the mobile device 400 described above with reference to FIG. 4.

The cellular network 502 can be configured as a GSM network and can provide data communications via GPRS and/or EDGE. Additionally, or alternatively, the cellular network 502 can be configured as a 3G Universal Mobile Telecommunications System ("UMTS") network and can provide data communications via the HSPA protocol family, for example, HSDPA, EUL, and HSPA+. The cellular network 502 also is compatible with mobile communications standards such as LTE, or the like, as well as evolved and future mobile standards.

The packet data network 504 includes various systems, devices, servers, computers, databases, and other devices in communication with one another, as is generally known. The user device(s) 110, the connected vehicle 104, the vehicle system(s) 112, the vehicle sensor(s) 114, the UAVs 124, the V2I platform(s) 126, the V2C platform(s) 128, the energy provider system 118, the inventory management system 120, or some combination thereof can communicate with each other via the packet data network 504. In some embodiments, the packet data network 504 is or includes one or more WI-FI networks, each of which can include one or more WI-FI access points, routers, switches, and other WI-FI network components. The packet data network 504 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable systems/devices 510 such as a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510.

Figure 6:
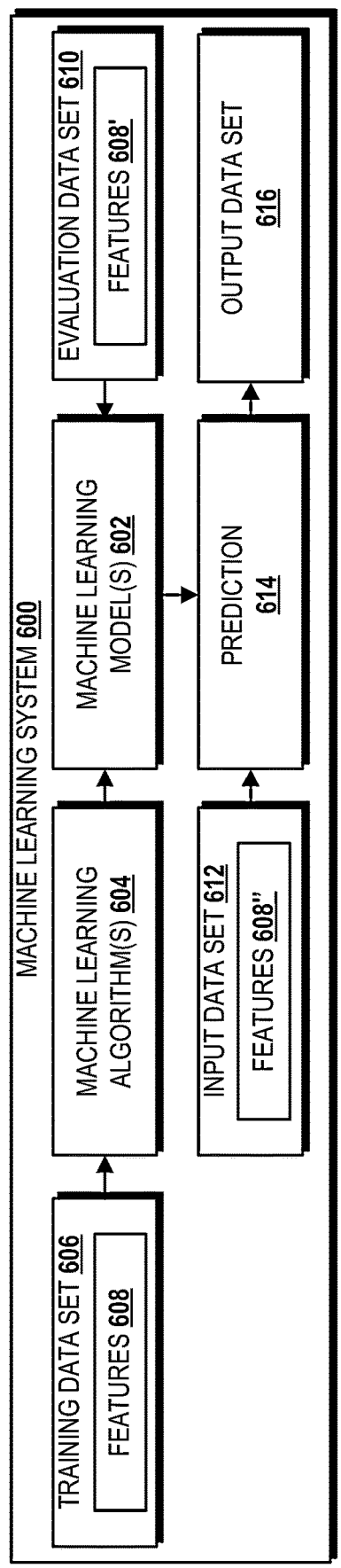
FIG. 6 is a block diagram illustrating an example machine learning system capable of implementing aspects of the concepts and technologies disclosed herein.

Turning now to FIG. 6, a machine learning system 600 capable of implementing aspects of the embodiments disclosed herein will be described. In some embodiments, aspects of the user device(s) 110, the connected vehicle 104, the vehicle system(s) 112, the vehicle sensor(s) 114, the UAVs 124, the V2I platform(s) 126, the V2C platform(s) 128, the energy provider system 118, the inventory management system 120, or a combination thereof can be improved via machine learning. Accordingly, user device(s) 110, the connected vehicle 104, the vehicle system(s) 112, the vehicle sensor(s) 114, the UAVs 124, the V2I platform(s) 126, the V2C platform(s) 128, the energy provider system 118, the inventory management system 120, or a combination thereof can include or can be in communication with a machine learning system 600 or multiple machine learning systems 600.

The illustrated machine learning system 600 includes one or more machine learning models 602. The machine learning models 602 can include, unsupervised, supervised, and/or semi-supervised learning models. The machine learning model(s) 602 can be created by the machine learning system 600 based upon one or more machine learning algorithms

604. The machine learning algorithm(s) 604 can be any existing, well-known algorithm, any proprietary algorithms, or any future machine learning algorithm. Some example machine learning algorithms 604 include, but are not limited to, neural networks, gradient descent, linear regression, logistic regression, linear discriminant analysis, classification tree, regression tree, Naive Bayes, K-nearest neighbor, learning vector quantization, support vector machines, any of the algorithms described herein, and the like. Classification and regression algorithms might find particular applicability to the concepts and technologies disclosed herein. Those skilled in the art will appreciate the applicability of various machine learning algorithms 604 based upon the problem(s) to be solved by machine learning via the machine learning system 600.

The machine learning system 600 can control the creation of the machine learning models 602 via one or more training parameters. In some embodiments, the training parameters are selected modelers at the direction of an enterprise, for example. Alternatively, in some embodiments, the training parameters are automatically selected based upon data provided in one or more training data sets 606. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 604 converges to the optimal weights. The machine learning algorithm 604 can update the weights for every data example included in the training data set 606. The size of an update is controlled by the learning rate. A learning rate that is too high might prevent the machine learning algorithm 604 from converging to the optimal weights. A learning rate that is too low might result in the machine learning algorithm 604 requiring multiple training passes to converge to the optimal weights.

The model size is regulated by the number of input features ("features") 608 in the training data set 606. A greater the number of features 608 yields a greater number of possible patterns that can be determined from the training data set 606. The model size should be selected to balance the resources (e.g., compute, memory, storage, etc.) needed for training and the predictive power of the resultant machine learning model 602.

The number of training passes indicates the number of training passes that the machine learning algorithm 604 makes over the training data set 606 during the training process. The number of training passes can be adjusted based, for example, on the size of the training data set 606, with larger training data sets being exposed to fewer training passes in consideration of time and/or resource utilization. The effectiveness of the resultant machine learning model 602 can be increased by multiple training passes.

Data shuffling is a training parameter designed to prevent the machine learning algorithm 604 from reaching false optimal weights due to the order in which data contained in the training data set 606 is processed. For example, data provided in rows and columns might be analyzed first row, second row, third row, etc., and thus an optimal weight might be obtained well before a full range of data has been considered. By data shuffling, the data contained in the training data set 606 can be analyzed more thoroughly and mitigate bias in the resultant machine learning model 602.

Regularization is a training parameter that helps to prevent the machine learning model 602 from memorizing training data from the training data set 606. In other words, the machine learning model 602 fits the training data set 606, but the predictive performance of the machine learning model 602 is not acceptable. Regularization helps the machine learning system 600 avoid this overfitting/memorization problem by adjusting extreme weight values of the features 608. For example, a feature that has a small weight value relative to the weight values of the other features in the training data set 606 can be adjusted to zero.

The machine learning system 600 can determine model accuracy after training by using one or more evaluation data sets 610 containing the same features 608' as the features 608 in the training data set 606. This also prevents the machine learning model 602 from simply memorizing the data contained in the training data set 606. The number of evaluation passes made by the machine learning system 600 can be regulated by a target model accuracy that, when reached, ends the evaluation process and the machine learning model 602 is considered ready for deployment.

After deployment, the machine learning model 602 can perform a prediction operation ("prediction") 614 with an input data set 612 having the same features 608" as the features 608 in the training data set 606 and the features 608' of the evaluation data set 610. The results of the prediction 614 are included in an output data set 616 consisting of predicted data. The machine learning model 602 can perform other operations, such as regression, classification, and others. As such, the example illustrated in FIG. 6 should not be construed as being limiting in any way.

Figure 7:
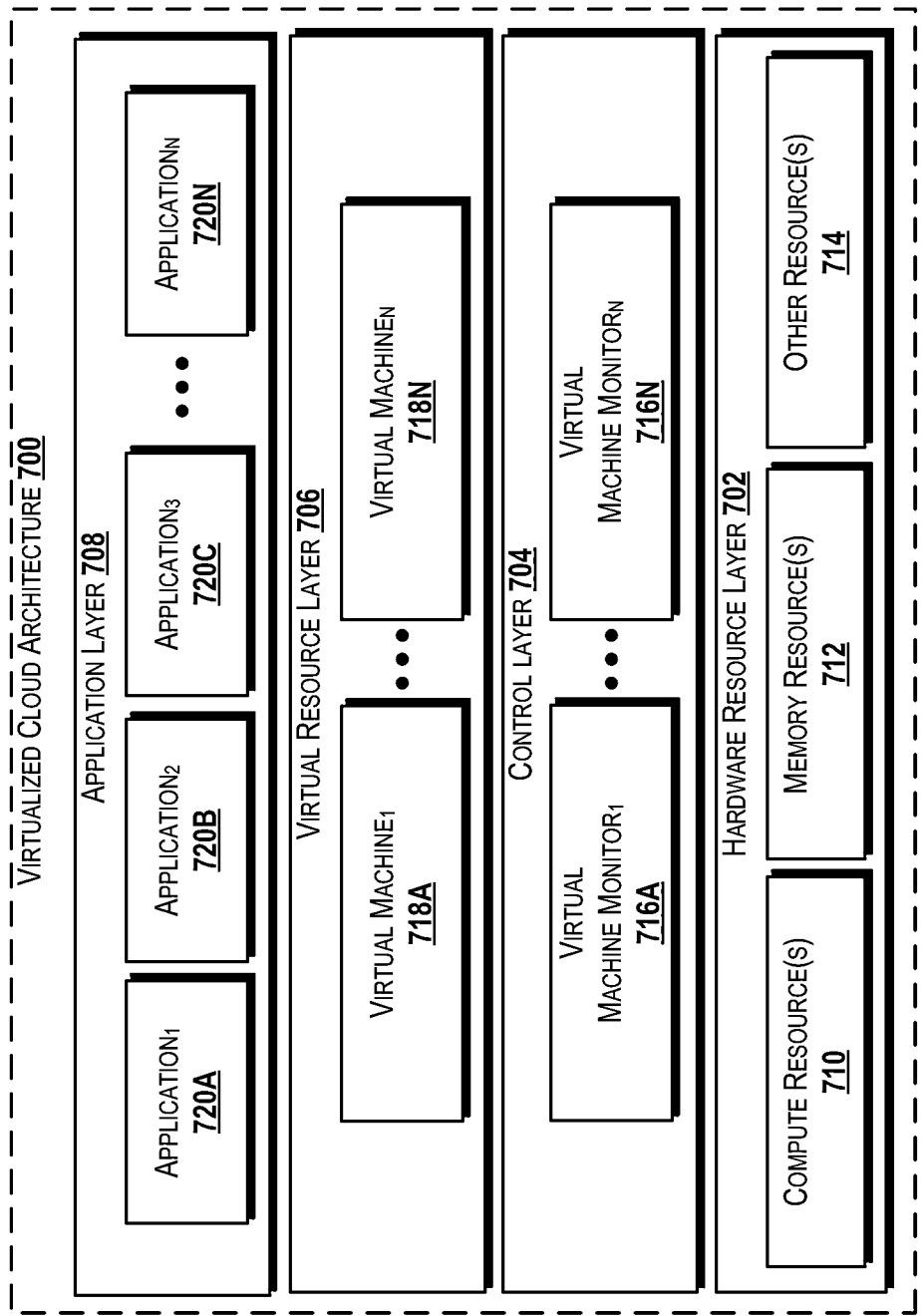
FIG. 7 is a block diagram illustrating a virtualized cloud architecture capable of implementing aspects of the concepts and technologies disclosed herein.

Turning now to FIG. 7, a block diagram illustrating an example virtualized cloud architecture 700 and components thereof will be described, according to an exemplary embodiment. In some embodiments, the virtualized cloud architecture 700 can be utilized to implement, at least in part, the user device(s) 110, the connected vehicle 104, the vehicle system(s) 112, the vehicle sensor(s) 114, the UAVs 124, the V2I platform(s) 126, the V2C platform(s) 128, the energy provider system 118, the inventory management system 120, or a combination thereof. The virtualized cloud architecture 700 is a shared infrastructure that can support multiple services and network applications. The illustrated virtualized cloud architecture 700 includes a hardware resource layer 702, a control layer 704, a virtual resource layer 706, and an application layer 708 that work together to perform operations as will be described in detail herein.

The hardware resource layer 702 provides hardware resources, which, in the illustrated embodiment, include one or more compute resources 710, one or more memory resources 712, and one or more other resources 714. The compute resource(s) 710 can include one or more hardware components that perform computations to process data, and/or to execute computer-executable instructions of one or more application programs, operating systems, and/or other software. The compute resources 710 can include one or more central processing units ("CPUs") configured with one or more processing cores. The compute resources 710 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 710 can include one or more discrete GPUs. In some other embodiments, the compute resources 710 can include CPU and GPU components that are configured in accordance with a co-processing CPU/GPU computing model, wherein the sequential part of an application executes on the CPU and the computationally-intensive part is accelerated by the GPU. The compute resources 710 can include one or more system-on-chip ("SoC") components along with one or more other components, including, for example, one or more of the memory resources 712, and/or one or more of the other resources 714. In some embodiments, the compute resources 710 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 710 can be or can include one or more hardware components architected in accordance with an advanced reduced instruction set computing ("RISC") machine ("ARM") architecture, available for license from ARM HOLDINGS. Alternatively, the compute resources 710 can be or can include one or more hardware components architected in accordance with an x86 architecture, such an architecture available from INTEL CORPORATION of Mountain View, California, and others. Those skilled in the art will appreciate the implementation of the compute resources 710 can utilize various computation architectures, and as such, the compute resources 710 should not be construed as being limited to any particular computation architecture or combination of computation architectures, including those explicitly disclosed herein.

The memory resource(s) 712 can include one or more hardware components that perform storage operations, including temporary or permanent storage operations. In some embodiments, the memory resource(s) 712 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 710.

The other resource(s) 714 can include any other hardware resources that can be utilized by the compute resources(s) 710 and/or the memory resource(s) 712 to perform operations described herein. The other resource(s) 714 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 716A-716N (also known as "hypervisors," hereinafter "VMMs 716") operating within the control layer 704 to manage one or more virtual resources that reside in the virtual resource layer 706. The VMMs 716 can be or can include software, firmware, and/or hardware that alone or in combination with other software, firmware, and/or hardware, manages one or more virtual resources operating within the virtual resource layer 706.

The virtual resources operating within the virtual resource layer 706 can include abstractions of at least a portion of the compute resources 710, the memory resources 712, the other resources 714, or any combination thereof. These abstractions are referred to herein as virtual machines ("VMs"). In the illustrated embodiment, the virtual resource layer 706 includes VMs 718A-718N (hereinafter "VMs 718"). Each of the VMs 718 can execute one or more applications 720A-720N in the application layer 708.

Based on the foregoing, it should be appreciated that aspects of anticipatory supply chain coordination with connected vehicle fleet and unmanned aerial vehicle integrations have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   obtaining, by an energy provider system comprising a processor, connected vehicle information from a connected vehicle, wherein the connected vehicle information comprises a vehicle identifier that uniquely identifies the connected vehicle, an energy capacity remaining for the connected vehicle, and a current location of the connected vehicle;
   obtaining, by the energy provider system, order information from an inventory management system, wherein the order information comprises a destination location to which a physical order is to be delivered;
   receiving, by the energy provider system, from a plurality of unmanned aerial vehicles, location information associated with the plurality of unmanned aerial vehicles;
   determining, by the energy provider system, a route to the destination location based, at least in part, upon the energy capacity remaining, the current location, and the location information associated with the plurality of unmanned aerial vehicles, wherein the route includes docking with an unmanned aerial vehicle of the plurality of unmanned aerial vehicles; and
   providing, by the energy provider system, the route to the connected vehicle, wherein the connected vehicle overrides a first-in-first-out order of processing the order information and the route to the destination location associated with the order information for an order that accommodates conditions determined by output from at least one of a vehicle system or a vehicle sensor of the connected vehicle, and wherein the connected vehicle utilizes the output from at least one of the vehicle system or the vehicle sensor to perform docking with the unmanned aerial vehicle.

2. The method of claim 1, wherein the connected vehicle is part of a connected vehicle fleet comprising a plurality of connected vehicles.

3. The method of claim 2, further comprising obtaining, by the energy provider system, additional connected vehicle information from the connected vehicle fleet, wherein the additional connected vehicle information comprises an additional vehicle identifier that uniquely identifies an additional connected vehicle of the plurality of connected vehicles in the connected vehicle fleet, an additional energy capacity remaining for the additional connected vehicle, and an additional current location of the additional connected vehicle.

4. The method of claim 3, further comprising:
determining, by the energy provider system, an additional route to the destination location based, at least in part, upon the additional energy capacity remaining and the additional current location of the additional connected vehicle; and
providing, by the energy provider system, the additional route to the additional connected vehicle.

5. The method of claim 1, further comprising:
obtaining, by the energy provider system, traffic information along the route; and
modifying, by the energy provider system, the route based upon the traffic information.

6. The method of claim 1, further comprising:
obtaining, by the energy provider system, unmanned aerial vehicle management information associated with the unmanned aerial vehicle, wherein the unmanned aerial vehicle is located in an airspace over the route; and
instructing, by the energy provider system, the unmanned aerial vehicle to dock with the connected vehicle.

7. The method of claim 6, wherein instructing, by the energy provider system, the unmanned aerial vehicle to dock with the connected vehicle comprises instructing, by the energy provider system, the unmanned aerial vehicle to dock with the connected vehicle to replenish, at least in part, an energy capacity of the connected vehicle.

8. The method of claim 7, wherein:
the connected vehicle comprises an electric-powered vehicle, the energy capacity comprises a battery capacity, and the energy capacity remaining comprises a battery capacity remaining of the electric-powered vehicle;
the connected vehicle comprises an internal combustion engine-powered vehicle, the energy capacity comprises a fuel capacity, and the energy capacity remaining comprises a fuel capacity remaining of the internal combustion engine-powered vehicle; or
the connected vehicle comprises a hybrid electric and internal combustion engine-powered vehicle, the energy capacity comprises a hybrid energy capacity, and the energy capacity remaining comprises a hybrid energy capacity remaining of the hybrid electric and internal combustion engine-powered vehicle.

9. The method of claim 6, wherein instructing, by the energy provider system, the unmanned aerial vehicle to dock with the connected vehicle comprises instructing, by the energy provider system, the unmanned aerial vehicle to dock with the connected vehicle to provide the connected vehicle with at least a portion of the physical order.

10. An energy provider system comprising:
a processor; and
a memory comprising instructions that, when executed by the processor, cause the processor to perform operations comprising
obtaining connected vehicle information from a connected vehicle, wherein the connected vehicle information comprises a vehicle identifier that uniquely identifies the connected vehicle, an energy capacity remaining for the connected vehicle, and a current location of the connected vehicle,
obtaining order information from an inventory management system, wherein the order information comprises a destination location to which a physical order is to be delivered,
receiving, from a plurality of unmanned aerial vehicles, location information associated with the plurality of unmanned aerial vehicles,
determining a route to the destination location based, at least in part, upon the energy capacity remaining, the current location, and the location information associated with the plurality of unmanned aerial vehicles, wherein the route includes docking with an unmanned aerial vehicle of the plurality of unmanned aerial vehicles, and
providing the route to the connected vehicle, wherein the connected vehicle overrides a first-in-first-out order of processing the order information and the route to the destination location associated with the order information for an order that accommodates conditions determined by output from at least one of a vehicle system or a vehicle sensor of the connected vehicle, and wherein the connected vehicle utilizes the output from at least one of the vehicle system or the vehicle sensor to perform docking with the unmanned aerial vehicle.

11. The energy provider system of claim 10, wherein the operations further comprise:
obtaining, by the energy provider system, traffic information along the route; and
modifying, by the energy provider system, the route based upon the traffic information.

12. The energy provider system of claim 10, wherein the operations further comprise:
obtaining unmanned aerial vehicle management information associated with the unmanned aerial vehicle, wherein the unmanned aerial vehicle is located in an airspace over the route; and
instructing the unmanned aerial vehicle to dock with the connected vehicle.

13. The energy provider system of claim 12, wherein instructing the unmanned aerial vehicle to dock with the connected vehicle comprises instructing the unmanned aerial vehicle to dock with the connected vehicle to replenish, at least in part, an energy capacity of the connected vehicle.

14. The energy provider system of claim 13, wherein instructing the unmanned aerial vehicle to dock with the connected vehicle to replenish, at least in part, the energy capacity of the connected vehicle comprises instructing the unmanned aerial vehicle to dock with the connected vehicle to replenish, at least in part, a fuel capacity of the connected vehicle.

15. The energy provider system of claim 13, wherein instructing the unmanned aerial vehicle to dock with the connected vehicle to replenish, at least in part, the energy capacity of the connected vehicle comprises instructing the unmanned aerial vehicle to dock with the connected vehicle to replenish, at least in part, a battery capacity of the connected vehicle.

16. The energy provider system of claim 12, wherein instructing the unmanned aerial vehicle to dock with the connected vehicle comprises instructing the unmanned aerial vehicle to dock with the connected vehicle to provide the connected vehicle with at least a portion of the physical order.

17. A computer-readable storage medium comprising computer-executable instructions that, when executed by a processor of an energy provider system, cause the processor to perform operations comprising:
   obtaining connected vehicle information from a connected vehicle, wherein the connected vehicle information comprises a vehicle identifier that uniquely identifies the connected vehicle, an energy capacity remaining for the connected vehicle, and a current location of the connected vehicle;
   obtaining order information from an inventory management system, wherein the order information comprises a destination location to which a physical order is to be delivered;
   receiving, from a plurality of unmanned aerial vehicles, location information associated with the plurality of unmanned aerial vehicles;
   determining a route to the destination location based, at least in part, upon the energy capacity remaining, the current location, and the location information associated with the plurality of unmanned aerial vehicles, wherein the route includes docking with an unmanned aerial vehicle of the plurality of unmanned aerial vehicles; and
   providing the route to the connected vehicle, wherein the connected vehicle overrides a first-in-first-out order of processing the order information and the route to the destination location associated with the order information for an order that accommodates conditions determined by output from at least one of a vehicle system or a vehicle sensor of the connected vehicle, and wherein the connected vehicle utilizes the output from at least one of the vehicle system or the vehicle sensor to perform docking with the unmanned aerial vehicle.

18. The computer-readable storage medium of claim 17, wherein the operations further comprise:
   obtaining, by the energy provider system, traffic information along the route; and
   modifying, by the energy provider system, the route based upon the traffic information.

19. The computer-readable storage medium of claim 17, wherein the operations further comprise:
   obtaining unmanned aerial vehicle management information associated with the unmanned aerial vehicle, wherein the unmanned aerial vehicle is located in an airspace over the route; and
   instructing the unmanned aerial vehicle to dock with the connected vehicle.

20. The computer-readable storage medium of claim 19, wherein instructing the unmanned aerial vehicle to dock with the connected vehicle comprises:
   instructing the unmanned aerial vehicle to dock with the connected vehicle to replenish, at least in part, an energy capacity of the connected vehicle; or
   instructing the unmanned aerial vehicle to dock with the connected vehicle to provide the connected vehicle with at least a portion of the physical order.

* * * * *